United States Patent Office 2,865,897
Patented Dec. 23, 1958

2,865,897

EPOXY ALKYL ESTERS OF POLYBASIC AROMATIC CARBOXYLIC ACIDS AND PROCESS OF MAKING SAME

Bernhard Raecke, Rudolf Köhler, and Helmut Pietsch, Dusseldorf, Germany, assignors to Henkel & Cie, G. m. b. H., Dusseldorf-Holthausen, Germany, a corporation of Germany No Drawing. Application September 14, 1953
Serial No. 380,133

Claims priority, application Germany September 20, 1952

6 Claims. (Cl. 260—78.4)

This invention relates to epoxy alkyl esters and more particularly to epoxy alkyl esters of polybasic aromatic carboxylic acids and to a process of making same.

It is one object of this invention to provide new and valuable epoxy alkyl esters of polybasic aromatic carboxylic acids and high molecular resinous condensation products derived therefrom.

Another object of this invention is to provide the crystalline terephthalic acid diglycide ester.

A further object of this invention is to provide products which are of great value in the plastics and artificial fiber industry.

Still another object of this invention is to provide a process of making new and valuable epoxy alkyl esters of polybasic aromatic carboxylic acids and high molecular resinous condensation products derived therefrom.

Other objects of this invention and advantageous features thereof will become apparent as the description proceeds.

In principle, said new and valuable epoxy alkyl esters of polybasic aromatic carboxylic acids are prepared by reacting halogenides of polybasic aromatic carboxylic acids with glycide, i. e. 2,3-expoxy-1-propanol, or its homologues, preferably in the presence of agents capable of splitting off hydrogen halide.

The halogenides of the following polybasic aromatic acids may, for instance, be employed for said reaction: Phthalic acid, isophthalic acid, terephthalic acid, mellithic acid, pyromellithic acid, naphthalic acid, 2,6-naphthylene dicarboxylic acid, tetrachloro phthalic acid, diphenyl-o,o'-dicarboxylic acid, diphenyl-p,p'-dicarboxylic acid, ethylene glycol bis-(p-carboxy phenyl) ether and the corresponding ethers of other glycols, such as trimethylene glycol and tetramethylene glycol bis-(p-carboxy phenyl) ether, furthermore $\alpha,\beta$-bis-(p-carboxy phenyl) ethane, and others.

Especially suitable halogenides for said reaction are the chlorides and bromides. The chlorides, however, are the preferred halogenides since they are readily available and comparatively inexpensive.

Glycide may be replaced in said reaction by equimolecular amounts of other epoxy compounds containing hydroxyl groups, for instance, 4-hydroxy butylene-1,2-oxide, anhydropentoses, anhydrohexoses (hydroxy methyl), oxa-cyclobutane, oleyl alcohol-oxide-9,10, and others.

The reaction is preferably carried out in the presence of agents capable of splitting off hydrogen halide, i. e. of hydrogen halide binding agents; the most preferred agents of this type are tertiary organic nitrogen bases, such as trimethylamine, triethylamine, pyridine, dimethylaniline and others.

In general, the reaction proceeds in the cold or at room temperature. If necessary, it may be completed by gently heating the reaction mixture.

The products formed in this reaction are the diglycide esters or homologuous esters of the corresponding polybasic aromatic carboxylic acids. These esters may be further condensed to higher molecular, non-distillable, resinous condensation products, containing several glycide ester groups in their molecule. Whether the reaction yields the one or the other of these types of reaction products as the preferred one, depends, among others, upon the reaction duration, reaction temperature, manner of working up the reaction products, and under certain conditions, upon the presence of moisture.

As stated above, the new epoxy alkyl esters are valuable intermediates, especially in the plastics and artificial fiber industry.

The reaction product is worked up in a very simple manner. The hydrogen halogenide of the base added to the reaction mixture can be removed from said mixture by washing with water. Or in case an indifferent diluting agent, such as toluene, benzene, benzine, carbon tetrachloride and the like was added to the reaction mixture, the hydrogen halide of the base added which is insoluble in said diluting agent may be filtered off. After distilling off the volatile components of said reaction mixture, the substantially halogen free reaction products remain in an excellent yield.

The epoxide-oxygen content of the reaction product is determined in a manner known per se by titrating the hydrochloric acid which is consumed by reacting the epoxide with a hydrochloric acid pyridine solution or with a hydrochloric acid-dioxane solution.

The following examples serve to illustrate this invention without, however, limiting the same thereto.

EXAMPLE 1

206 g. of symmetric phthalic acid dichloride are allowed to run into a mixture of 150 g. of glycide, 225 g. of triethylamine, and 600 cc. of toluene within about one hour, while cooling thoroughly and stirring. Stirring is continued for a further hour, the precipitated chlorohydrate is filtered off, and is washed with toluene. The dry salt obtained thereby weighs 290 g. Toluene is removed from the filtrate by distillation at a bath temperature up to 160° C. and at a vacuum of about 10 mm. mercury. The residue (230 g.) has the following characteristic properties and analytical value:

Epoxide-oxygen content_____ percent__ 8.1
Nitrogen content_____ do____ 0.87
Chlorine content_____ do____ 
Saponification number_____ Traces
Molecular weight_____ 394
                                              250

On distilling said product, finally at a bath temperature of 190° C. and in a vacuum of 0.7 mm. mercury until no further distillate is obtained, 220 g. of a dark resin which is highly viscous at room temperature are obtained as residue. Said resin has the following characteristic properties and analytical value:

Epoxide-oxygen content_____ percent__ 7.0
Nitrogen content_____ do____ 1.4
Chlorine content_____ do____ 
Saponification number_____ Traces
Molecular weight_____ 420
                                              480

EXAMPLE 2

A solution of 20.6 g. of pure terephthalic acid chloride in 100 cc. of benzene is added drop by drop to a mixture of 15 g. of glycide and 23 g. of triethylamine at 0–5° C. within 1½ hour while cooling and stirring. Stirring is continued for 2 further hours whereby the temperature of the reaction mixture is allowed to increase to room temperature. 29 g. of precipitated triethylamine hydrochloride are filtered off, preferably after standing overnight and the benzene is distilled off in a vacuum until crystals start to precipitate. Crystallization may be enhanced by the addition of petroleum ether. The resulting diglycide ester of terephthalic acid is readily recrystallized from a mixture of equal parts of benzene and petroleum ether. Said ester melts at 108–109° C. The yield exceeds 80% of the theoretical yield.

*Analytical data*

|  | found | calculated for $C_{14}H_{14}O_6$ |
|---|---|---|
|  | Percent | Percent |
| Epoxide-oxygen content | 11.7 | 11.5 |
| Carbon | 60.65 | 60.4 |
| Hydrogen | 5.2 | 5.0 |

In place of phthalic acid dichloride and terephthalic acid dichloride as used in the preceding examples there may be employed the chlorides and bromides of other polybasic aromatic carboxylic acids in equimolecular amounts. Likewise, equimolecular amounts of other epoxy compounds containing hydroxyl groups, than glycide as used in said examples, such as 4-hydroxy butylene - 1,2-oxide, anhydropentoses, anhydrohexoses, (hydroxy methyl) oxa-cyclobutane, oleyl alcohol-oxide-9,10, and others, may be reacted with such halogenides. In place of triethylamine one may use other tertiary organic nitrogen bases as hydrogen halide binding agents. It is not necessary to carry out the reaction in the presence of a diluting agent although such agents permit better control of the reaction temperature and prevent too high an increase thereof.

Other changes and variations in the starting materials employed, the acid binding agent used, the reaction temperature and duration, the diluting agent added to the reaction mixture, the methods of working up said reaction mixture and of isolating the desired reaction products therefrom, the condensation of the resulting diglycide esters or their homologues to resinous condensation products containing several glycide ester groups in their molecule, and the like may be made by those skilled in the art in accordance with the principles set forth herein and in the claims annexed hereto.

We claim:

1. A process of producing glycide esters of aromatic hydrocarbon dicarboxylic acids and resinous epoxy polymers thereof comprising the steps of reacting at temperatures up to room temperatures an aromatic hydrocarbon dicarboxylic acid halide with glycide in the presence of a sufficient amount of a tertiary amino compound to react stoichiometrically with the hydrogen halide produced.

2. The process of claim 1 wherein the aromatic hydrocarbon dicarboxylic acid halide is a phthalic acid dihalide.

3. A process of producing resinous epoxy polymers of diglycide esters of aromatic hydrocarbon dicarboxylic acids comprising the steps of reacting at temperatures up to room temperatures an aromatic hydrocarbon dicarboxylic acid dihalide with glycide in the presence of a sufficient amount of a tertiary amino compound to react stoichiometrically with the hydrogen halide produced, removing the amino hydrogen halide salt, and stripping the residue of unreacted constituents and monomers by distillation in a high vacuum.

4. A process of producing diglycide esters of aromatic hydrocarbon dicarboxylic acids comprising the steps of reacting at temperatures up to room temperature an aromatic hydrocarbon dicarboxylic acid dihalide with glycide in the presence of a sufficient amount of a tertiary amino compound to react stoichiometrically with the hydrogen halide produced and removing the amino hydrogen halide salt.

5. A process of producing a diglycide ester of terephthalic acid comprising the steps of reacting at temperatures up to room temperature terephthalic acid dichloride with glycide in the presence of a sufficient amount of triethylamine to react stoichiometrically with the hydrogen chloride produced, said reactants being dissolved in a solvent selected from the group consisting of benzene, toluene and carbon tetrachloride, removing the insoluble triethylamine hydrogen chloride salt and excess solvent, and crystallizing pure diglycidyl terephthalate from the concentrated solution.

6. A proces of producing resinous epoxy polymers of diglycidyl phthalate comprising the steps of reacting at temperatures up to room temperature phthalic acid dichloride with glycide in the presence of a sufficient amount of triethylamine to react stoichiometrically with the hydrogen chloride produced, said reactants being dissolved in a solvent selected from the group consisting of benzene, toluene and carbon tetrachloride, removing the insoluble triethylamine hydrogen chloride, distilling off the solvent and stripping the residue of unreacted constituents and monomers by distillation in a high vacuum.

References Cited in the file of this patent

UNITED STATES PATENTS

| 2,089,569 | Orthner | Aug. 10, 1937 |
| 2,448,602 | Kester | Sept. 7, 1948 |
| 2,476,922 | Shokal | July 19, 1949 |
| 2,559,177 | Terry | July 3, 1951 |
| 2,567,842 | Erickson | Sept. 11, 1951 |
| 2,671,064 | Cowell et al. | Mar. 2, 1954 |
| 2,781,333 | Updegraff | Feb. 12, 1957 |

FOREIGN PATENTS

| 518,057 | Great Britain | Feb. 15, 1940 |